United States Patent [19]

Herskovits

[11] 4,404,118

[45] Sep. 13, 1983

[54] REGENERATION OF ADSORBENTS BY LOW TEMPERATURE HYDROGEN STRIPPING

[75] Inventor: Lily E. Herskovits, Glenview, Ill.

[73] Assignee: UOP Inc., Des Plaines, Ill.

[21] Appl. No.: 334,501

[22] Filed: Dec. 28, 1981

[51] Int. Cl.$^3$ .................... B01J 20/34; C10G 25/12; C07C 7/13; C07C 7/12

[52] U.S. Cl. .................... 252/411 R; 55/75; 210/672; 210/690; 208/245; 208/305; 208/310 R; 208/310 Z; 585/826; 252/411 S

[58] Field of Search .................... 252/411 R, 411 S; 208/245, 305, 310 R, 310 Z; 585/826

[56] References Cited

U.S. PATENT DOCUMENTS

| | | | |
|---|---|---|---|
| 2,653,959 | 9/1953 | Moore et al. | 260/450 |
| 2,943,105 | 6/1960 | Caruthers | 260/450 |
| 3,182,014 | 5/1965 | Seelig et al. | 585/826 |
| 3,188,293 | 6/1965 | Bacon et al. | 252/411 R |
| 3,489,808 | 1/1970 | Eberly, Jr. | 260/674 |
| 3,725,299 | 4/1973 | Turnock et al. | 208/245 |
| 3,931,350 | 1/1976 | Sparks | 260/671 B |
| 4,098,684 | 7/1978 | Innes | 208/245 |
| 4,337,156 | 6/1982 | deRosset | 208/310 Z |

FOREIGN PATENT DOCUMENTS 52-38498  3/1977  Japan .................... 252/420

*Primary Examiner*—P. E. Konopka
*Attorney, Agent, or Firm*—James R. Hoatson, Jr.; John F. Spears, Jr.; William H. Page, II

[57] ABSTRACT

A method is disclosed for regenerating a solid adsorbent which has been used to remove oxygen-containing hydrocarbonaceous compounds, water or sulfur-containing compounds from a hydrocarbon stream. The method is preferably applied to molecular sieves which have been used to remove ethers, alcohols and/or water from a light liquid phase hydrocarbon stream such as a stream which is rich in $C_4$ hydrocarbons. The regeneration method includes stripping the adsorbent with a low temperature hydrogen-rich gas stream, which preferably has a temperature below about 200° F., and then gradually increasing the temperature of the gas stream to customary regeneration temperatures.

9 Claims, No Drawings

REGENERATION OF ADSORBENTS BY LOW TEMPERATURE HYDROGEN STRIPPING

FIELD OF THE INVENTION

The invention relates to the general field of the use of regenerable solid adsorbents to remove undesired compounds from a hydrocarbon stream. The invention is more directly related to a method of regenerating a zeolitic material or other solid used as an adsorbent. A specific concern of the invention is the thermal regeneration of a molecular sieve which has been used to remove compounds such as oxygen-containing hydrocarbonaceous compounds, water and sulfur-containing compounds from a light hydrocarbon stream in a hydrocarbon conversion process.

PRIOR ART

It it well known to use a solid adsorbent, such as alumina or zeolitic materials, to treat liquid and vapor phase process streams for the removal of small concentrations of undesired contaminants. These adsorbents are often used to remove water, sulfur compounds or various classes of hydrocarbonaceous compounds such as oxygenated compounds or chlorinated compounds from a process stream. This may be performed either as a means of purifying a product stream or to remove harmful compounds from a recycle stream within a process. The use of solid adsorbents to remove impurities including oxygen-containing hydrocarbonaceous compounds from paraffinic hydrocarbons is taught in U.S. Pat. No. 3,931,350.

The basic methods of regenerating an adsorbent are by either a significant reduction in pressure and/or a significant increase in temperature. This change in condition(s) changes the adsorption equilibrium of the adsorbed compounds thereby causing the release of a significant percentage of these compounds. For instance, U.S. Pat. No. 4,098,684 describes the regeneration of molecular sieves such as types 13X and 4A molecular sieves which were used to remove sulfur compounds from a liquid paraffin-containing feedstock by a hot purge gas preferably at a temperature between 350° and 600° F. (177° and 316° C.). Suitable purge gases are said to include hydrogen, nitrogen and carbon dioxide.

U.S. Pat. No. 2,653,959 discloses a process in which an adsorbent, which is characterized as a silica gel, activated carbon, activated alumina or a zeolite, is used to remove such oxygen-containing compounds as aldehydes, ketones, esters, acids and alcohols from a vapor phase process stream. The adsorbent is regenerated in a hydrogenation-desorption zone which is at a temperature between 300° and 800° F. The regeneration occurs in a fluidized bed which is fluidized by high temperature hydrogen. The ketones, esters, acids and aldehydes are reduced to alcohols which are desorbed from the adsorbent. The minimum regeneration temperature is described in column 4 as being at least 200 Fahrenheit degrees above the boiling point of the adsorbed oxygen-containing compound.

U.S. Pat. No. 3,489,808 describes a very specific situation in which the hydrogen form of zeolite D or hydrogen-chabazite is used to remove alcohols from a hydrocarbon stream. These alcohols are separated and then dehydrated to form olefins and water. This reference is pertinent for its teaching that the adsorbent may be regenerated with an inert gas purge, which may be nitrogen, at a temperature between 75° and 200° F. (column 4, line 20). The reference also states a rise in temperature of about 100 to 400 Fahrenheit degrees accompanied by an inert purge gas may be used for desorption.

U.S. Pat. No. 2,943,105 describes a method for recovering oxygenated chemical compounds from a hydrocarbon mixture produced from hydrogen and carbon monoxide. The reference teaches the adsorbed compounds may be removed from an adsorbent, such as silica gel, activated alumina and the like, by either the use of steam or by elution with a light hydrocarbon having a temperature of from about 200° to 325° F.

It is believed that heretofore low temperature hydrogen stripping has not been used as a preliminary step in the thermal regeneration of solid adsorbents. It is further believed that low temperature hydrogen has not previously been used in the regeneration of molecular sieves used to remove oxygenates from a mixture of light hydrocarbons including mixtures of paraffinic, olefinic and diolefinic hydrocarbons.

BRIEF SUMMARY OF THE INVENTION

The invention provides an improved method of regenerating a zeolitic adsorbent used to remove sulfur-containing compounds and/or oxygenates from hydrocarbon streams. The subject invention results in an improved regeneration method since losses in adsorption capacity of adsorbent during regeneration are reduced or eliminated.

The basic step of the subject regeneration method may be characterized as comprising contacting the used adsorbent with a flowing hydrogen-rich gas stream having a temperature below about 260° F. for at least 15 minutes prior to any regeneration step performed at a higher temperature. Preferably, the gas stream initially has a temperature below about 200° F. and is gradually increased in temperature to about 400°–500° F. The adsorbent and the gas stream are both maintained at the initial low temperature until the low temperature hydrogen stripping step of the regeneration procedure is completed.

DETAILED DESCRIPTION

Although the use of regenerable adsorbents is widespread in the petrochemical, chemical and petroleum refining industries, there are several commercial applications or potentially commercial applications for which a truly regenerable adsorbent has not been found. For instance, alumina is used to dry the feed stream to commercial butane isomerization units to prevent catalyst deactivation by water. Regeneration of these alumina driers or treaters is performed by passing a high temperature hydrocarbon stream, typically a portion of the isomerate, through the alumina. This regeneration is not totally effective and can only be performed several times before it is necessary to replace the alumina. The labor costs, alumina replacement costs and disposal costs of replacing the adsorbent are substantial. Similar situations exist in other applications in which adsorbents are used to remove a contaminant from a feed, recycle or product stream. That is, although the adsorbent may be referred to as regenerable the adsorption capacity of the adsorbent is not fully restored by the regeneration procedure which is employed. It is eventually necessary to replace the adsorbent thereby incurring significant costs.

Another aspect of current regeneration techniques which allows for improvement resides in the prior art practice of utilizing a regeneration media which is similar in nature to the process stream being treated by the adsorbent. That is, the stream being treated and the regeneration media may often have similar or overlapping carbon number ranges as in the use of isomerate to regenerate isomerization zone feed treaters referred to above. The adsorption-regeneration sequence therefore serves to merely transfer certain compounds from one stream to another. For instance, if an LPG stream is used to regenerate an adsorbent which was used to treat a $C_4$ fraction then the contaminants are transferred to the LPG stream. Subsequently separating these contaminants from the regeneration media to prepare it for recycling or other use may be difficult and lead to significant expense since it may require fractionation or other extensive separation techniques.

It is an objective of the subject invention to provide an improved adsorbent regeneration procedure. It is a further objective of the subject invention to improve the regeneration of zeolitic adsorbents which have been used to remove an impurity from a light hydrocarbon stream. It is a specific objective of the invention to provide an improved regeneration procedure for solid adsorbents which have been used to remove water and possibly other contaminants including oxygenates from a process stream comprising $C_4$ hydrocarbons including $C_4$ diolefins. It is another objective of the subject invention to provide a regeneration procedure which allows simple recovery, purification and recycling of the regeneration media.

The subject regeneration method comprises an initial low temperature stripping or pretreatment step in which the adsorbent is contacted with a hydrogen-rich gas stream. This step of course requires the prior cessation of the use of the adsorbent as it is being employed to remove impurities from the process stream. It will also require the draining of the remnants of a liquid phase process stream from the adsorbent if it is retained in a fixed bed. The initial flow of the hydrogen-rich gas stream of the subject method could be used to promote the removal of the liquid or vapor-phase process stream from the adsorbent although this could also be performed by other inert gases such as nitrogen. This initial preparation of the adsorbent for regeneration may be varied as required to adjust for the manner in which the adsorbent is utilized, as it is contemplated that the subject method could be employed with a fixed bed of adsorbent, an ebulated bed of adsorbent, a moving bed of adsorbent or with fluidized beds of adsorbents. A fluidized bed of adsorbent can be regenerated in the same vessel used to treat the process or feed stream or in a separate vessel to provide a continuous adsorption process.

The low temperature hydrogen rich gas stream used in the subject method should contain at least 50 mole percent hydrogen. It is preferred that if practical the hydrogen-rich gas stream contains over 80 mole percent hydrogen and it is highly preferred that a gas stream containing at least 90 mole percent hydrogen be employed. The preferred diluents in the hydrogen-rich gas stream are nitrogen, methane and ethane. It is highly preferred that the hydrogen-rich gas stream is substantially free (less than 5 mole percent) of any component of the process stream purified by the adsorbent, and it is especially preferred that the hydrogen-rich gas stream is substantially free of unsaturated hydrocarbons and oxygenated hydrocarbonaceous compounds, which are often referred to as oxygenates. It is important that the hydrogen-rich gas stream is free of any compounds having a lasting detrimental effect on the adsorptive capacity of the adsorbent.

The hydrogen-rich gas stream should have a temperature less than about 260° F. (127° C.) when it is first contacted with the unregenerated adsorbent. It is preferred that this gas stream has a temperature below 220° F. (104° C.). Lower temperatures are more highly preferred and temperatures below about 200° F. (93° C.) represent the preferred initial temperature of the hydrogen-rich gas stream. Temperatures as low as 60° F. (15.6° C.) could be employed but it is believed these lower temperatures are not required to obtain the full benefits of the subject method. The adsorbent should be subjected to no operation or procedure which subjects it to a temperature above the initial temperature of the hydrogen-rich gas stream used in the regeneration procedure prior to being contacted with the hydrogen-rich gas stream. It is therefore preferred that the average temperature of the adsorbent before being contacted with the hydrogen-rich gas stream is less than 200° F. (93° C.).

The hydrogen-rich gas stream should contact the adsorbent at a low temperature for a significant period of time, which should be longer than 15 minutes, before the temperature of the gas stream is increased. It is preferred that this initial low temperature step is performed for at least one hour. The optimum length of time will be determined by balancing costs and/or operating practicalities against the achieved degree of regeneration. One important factor to be considered in this is the initial temperature of the hydrogen-rich gas stream. As a general rule the length of time at the initial temperature should increase as the initial temperature of the hydrogen-rich gas stream increases. For instance, if the gas stream has an initial temperature of about 100° F. (38° C.) or lower, then it is believed unnecessary to remain at this relatively low initial temperature for any significant length of time and the temperature of the gas stream can be raised fairly quickly to a higher temperature. However, this higher temperature is to be below the previously set out temperatures, which range from 200°-260° F., and the temperature of the gas stream should be held below 200°-260° F. for a significant time period which functions as the low temperature contacting step.

The rate at which the hydrogen is passed through the adsorbent is subject to significant variation and may range from about 100 to about 10,000 GHSV (gas hourly space velocity) for a fixed bed of adsorbent. The preferred hydrogen flow rate is a GHSV in the range of 300 to 1,000.

Following the low temperature contacting step the temperature of the hydrogen-rich gas stream is increased as needed to complete the regeneration. This temperature increase should be gradual and is preferably performed at a fairly uniform rate which is less than about 50 Fahrenheit degrees per hour. The temperature required for regeneration will normally be above 400° F. (204° C.) and it will often be desired to increase the temperature of the hydrogen-rich gas stream above 500° F. (260° C.).

It is preferred that the subject regeneration procedure is employed to regenerate an adsorbent which has been used to remove contaminants from a hydrocarbon process stream. The process stream is preferably rich in hydrocarbons having less than 12 carbon atoms per molecule and more preferably is rich in hydrocarbons having less than 6 carbon atoms per molecule. The treated stream may be rich in light hydrocarbons and essentially free of any $C_6$-plus hydrocarbons. The feed stream may therefore comprise 50 or more percent $C_4$ hydrocarbons including n-butane, isobutane, butylenes and butadiene. The invention is belived to be especially useful when the process stream contains, either as a main component or as an impurity which is to be removed by the adsorbent, an unsaturated hydrocarbon, such as olefinic and/or diolefinic hydrocarbons, having less than 6 carbon atoms per molecule. As used herein the term "rich" is intended to indicate a concentration of the indicated compound which is above 50 mole percent.

One embodiment of the invention may be characterized as a method for regenerating a solid adsorbent which has been used to remove undesired impurities from a process stream comprising a hydrocarbon having less than 12 carbon atoms per molecule, and unsaturated hydrocarbons containing less than 6 carbon atoms per molecule which comprises stripping the adsorbent with a hydrogen-rich gas stream having a temperature less than about 260° F. and then gradually increasing the temperature of the gas stream to a temperature above about 400° F.

The contaminants or impurities which are removed from the process stream by the adsorbent prior to regeneration are quite diverse. They include water and sulfur-containing compounds including mercaptans and carbon disulfide. Halogenated compounds, nitrogenous compounds and unsaturated hydrocarbons may also be considered contaminants in some hydrocarbon streams although in other instances it may be desired to remove a contaminant while not removing any of the unsaturated hydrocarbons. That is the olefins may be a desired component of the stream being treated. The unsaturated hydrocarbons may be either mono or diolefinic hydrocarbons such as isobutylene and butadiene. The contaminants may also be oxygenated hydrocarbonaceous compounds such as alcohols, ethers, ketones and acids. Specific examples of these oxygenates are ethanol, methanol, tertiary butyl alcohol, dimethyl ether and methyl tertiary butyl ether. These contaminants are removed at conventional adsorption-promoting conditions which may include a pressure from about 5 to 200 psia, a temperature below 180° F. (83° C.) and preferably ambient temperatures below 100° F. (38° C.) and at a flow rate which provides a Reynolds number of about 25–50.

The invention may therefore be characterized as a method for regenerating a bed of a solid adsorbent which has been used to remove a compound chosen from the group consisting of nitrogenous compounds, unsaturated hydrocarbons, oxygenated hydrocarbonaceous compounds, water, halogenated hydrocarbonaceous compounds and sulfur-containing compounds from a process stream comprising a paraffinic hydrocarbon having less than seven carbon atoms per molecule and an olefinic hydrocarbon having less than seven carbon atoms per molecule which comprises passing a hydrogen-rich gas stream having a temperature below about 220° F. through the bed of solid adsorbent, gradually increasing the temperature of the gas stream to a temperature of at least 400° F., and then continuing to pass the gas stream through the bed of adsorbent.

A specific advantage of the subject invention is that the compounds released by the adsorbent during regeneration become part of the hydrogen-rich stream and may often be easily removed from this stream as by condensation. This is in contrast to regeneration methods in which the same class of compound is treated and used as a regeneration media. As previously mentioned an example of this is the use of isomerate to regenerate alumina used in a butane isomerization process to dry a normal butane feed stream.

The use of hydrogen as a regeneration media is also desirable if, as in most petroleum refineries, hydrogen is readily available and another separate regeneration media is not required. It may also be very advantageous to dispose of used hydrogen by injecting it into a hydrotreating zone rather than attempting to recycle the hydrogen. This is especially true when the released compounds are undesirable in any stream removed from the adsorption zone. For instance, in the butane isomerization example just set out the presence of water in the isomerate could be tolerable while the presence of sulfur compounds is normally very desirable.

It is believed the subject regeneration method may be employed with any type of solid adsorbent which may be regenerated by a thermal or high temperature regeneration procedure. It is preferred that the solid adsorbent is of the physical rather than the chemical type. Alumina is a preferred adsorbent, with zeolitic materials commonly referred to as molecular sieves being an especially preferred adsorbent. The particular types of molecular sieves which are preferred for use as adsorbents and for regeneration by the subject invention include type 3A, type 5A, and type 13X. It is contemplated that the subject regeneration method may be used on adsorbents comprising a naturally occurring substance such as one of the clays used to treat hydrocarbons.

The compounds which evolve from the adsorbent during the regeneration procedure are preferably removed from the hydrogen-rich gas stream to allow recycling or other utilization of this valuable gas. This separation may be performed by cooling the gas stream sufficiently to effect the condensation of a major portion of these evolved compounds and then passing the gas stream through a vapor-liquid separation. As previously stated the option of applying this rather facile separation procedure is an advantage over regeneration procedures in which a hydrocarbon such as propane or butane is utilized as a regeneration media and the evolved compounds are in the same or an overlapping boiling point range. In this instance it is necessary to employ more extensive fractionation or other separatory facilities to separate the evolved compounds from the regeneration media.

It is believed that the subject method has another advantage over conventional high temperature regeneration procedures when the process stream contains unsaturated hydrocarbons and especially if the process stream contains diolefins. The basis of this is the concept that the subject process is believed to hydrogenate at least a portion of these compounds and thereby prevent the olefins or diolefins from polymerizing. This is believed to occur at lower temperatures than conventional regeneration methods employ. The subject process may also effect the "monomerization" and vaporization of any existing polymeric deposits and thereby keep the surface of the adsorbent clear of polymeric deposits. For these reasons the low temperature hydrogen stripping procedure of the subject method is believed superior to the use of hydrocarbons or inert compounds such as nitrogen or steam as the regeneration media, especially as compared to prior art processes in which the initial contacting is performed at or close to the final regeneration temperature.

The following examples demonstrate the effectiveness of the subject process.

EXAMPLE I

A type 5A molecular sieve was used to treat a stream comprising 95 wt.% isobutane, 5 wt.% $C_3$ hydrocarbons, 0.1 wt.% dimethyl ether, 0.02 wt.% methyl tertiary butyl ether (MTBE), 0.02 wt.% methanol and 0.025 wt.% water. The liquid phase feed stream was passed through a bed of the molecular sieve at a liquid hourly space velocity of 0.5 $hr^{-1}$, a pressure of 50 psig and an ambient laboratory temperature (less than 100° F.). The sieve was in the form of 1/16-inch spheres contained in a fixed bed. Samples of the effluent of the adsorbent bed were taken every 8 hours for the first two days and then once a day until the run was completed. The samples were analyzed for oxygenate content and the run was terminated when saturation of the adsorbent was observed.

The adsorbent was then regenerated by the following procedure. The flow of the feed stream was stopped and the residual feed material was removed. The adsorbent bed was then stripped at a rate of about 380 gas hourly space velocity (volumes of gas at standard conditions per hour per volume of adsorbent) with high purity hydrogen, greater than 95% hydrogen, at a temperature of 200° F. for two hours. The temperature of the hydrogen stream was gradually increased to 500° F. and maintained at this temperature for about 4 to 6 hours until no significant amounts of evolved materials were detected in the gases removed from the adsorbent bed.

The use of the adsorbent to treat the feed stream was then repeated to observe the effectiveness of the regeneration procedure. It was found that this regeneration procedure resulted in no loss in adsorption capacity of the adsorbent.

EXAMPLE 2

The same procedure as set forth in Example 1 was performed using a Type 13X molecular sieve. It was again found that the regeneration procedure resulted in no loss in adsorption capacity of the molecular sieve.

EXAMPLE 3

The procedure of Example 1 was followed except that the feed stream was modified to contain 3 wt.% $C_3$ hydrocarbons, 2 wt.% butenes and 0.015 wt.% dimethylsulfoxide. The treated effluent of the adsorbent bed was also subjected to a sulfur analysis.

Once again the regeneration completely restored the adsorption capacity of the type 5A molecular sieve.

EXAMPLE 4

The procedure of Example 3 was follwed using a type 13X molecular sieve. The same regeneration procedure as Example 1 resulted in a restoration of the full adsorption capacity of the type 13X molecular sieve.

I claim as my invention:

1. A method of regenerating a solid adsorbent containing oxygenated hydrocarbonaceous impurities, said impurities being existent as a result of treating a process stream comprising a hydrocarbon having less than 12 carbon atoms per molecule with said adsorbent which comprises:
   (a) contacting said solid adsorbent with a hydrogen-rich stream for at least one hour at a low temperature below about 200° F. to hydrogenate at least a portion of said oxygenated hydrocarbonaceous impurities at said low temperature; and then
   (b) increasing said low temperature to a high temperature above 400° F. at a uniform rate less than 50° F. per hour to complete regeneration of said solid adsorbent without loss of adsorption capacity.

2. The method of claim 1 further characterized in that the average temperature of the adsorbent before being contacted with the hydrogen-rich gas stream is less than 200° F.

3. The method of claim 2 further characterized in that the adsorbent comprises an alumina.

4. The method of claim 2 further characterized in that the adsorbent comprises a zeolitic material.

5. The method of claim 4 further characterized in that the adsorbent is a type 5A or a type 13X molecular sieve.

6. The method of claim 1 further characterized in that the process stream comprises olefinic and diolefinic hydrocarbons having less than 6 carbon atoms per molecule.

7. The method of claim 1 further characterized in that the adsorbent is a naturally occurring material.

8. The method of claim 1 further characterized in that the process stream comprises diolefinic hydrocarbons.

9. The method of claim 1 further characterized in that the process stream comprises 50 mole percent $C_4$ hydrocarbons.

* * * * *